Patented Oct. 19, 1937

2,095,992

UNITED STATES PATENT OFFICE 2,095,992

DOUGH IMPROVER FOR LEAVENED BAKERY PRODUCTS

Charles H. MacIntosh, Kansas City, Mo., assignor to Standard Brands Incorporated, New York, N. Y., a corporation of Delaware No Drawing. Application January 3, 1936, Serial No. 57,396

44 Claims. (Cl. 99—91)

This invention relates to processing dough for yeast leavened bakery products, and particularly to flour improvers, and has for its principal object to provide a composition of this character for improving the maturing action in doughs, whereby the resulting bakery products have a finer, more silky texture with improved color of crumb.

A further object of the invention is to provide a novel composition of matter which is more effective in giving the dough a tougher and more homogeneous and flexible consistency, so that a greater number of individual gas cells remain intact without rupturing, thereby increasing its gas retaining properties, which produces bakery products of better texture and keeping quality.

In preparation of dough mixtures, yeast with its enzymes is introduced into a plastic flour and water mixture to effect fermentation wherein large quantities of carbon dioxide gas are generated and evolved, and the hydrogen ion concentration of the mix is progressively increased to that productive of the desired physical characteristics for good bakery products as characterized by volume relatively to a given weight of dough, size and arrangement of the cell structure, appearance, and keeping qualities.

All of these characteristics are dependent upon gas retaining properties of the dough, which in turn are governed by changes in the physical properties brought about with the development and final attainment of a definite hydrogen ion concentration and other factors incidental to fermentation.

Obviously, if dough is sufficiently viscous, extremely elastic, yet tough, it is capable of producing extremely thin films which will not rupture, but which will retain the generated gas, thereby effecting the increased volume and finer, more uniform cell structure.

Heretofore, dough maturing effects have been brought about by introducing into the flour or dough mix an innocuous bromine compound, such as potassium bromate.

I have found that by including minute amounts of vanadium compounds in conjunction with an innocuous oxidizing compound of a halogen belonging to the group chlorine, bromine and iodine, such as sodium and potassium chlorate, bromate and iodate, and especially a bromate, I am enabled to obtain superior results with smaller quantities of the bromate, whereby the bakery products have a finer, more silky texture and better color of crumb.

While I am not fully aware of the exact chemical reaction with the halogen compound as, for example, between the bromate and vanadium, it is my belief that the vanadium acts as a catalyst in promoting activity of the bromate in its dough maturing action, so that better maturing action is brought about with less than the normal quantities of the bromate commonly used as a dough maturing agent. In addition to improved dough maturing action, the gas retention properties of the dough are greatly increased to bring about a much finer and more evenly distributed cell structure throughout the dough mass.

Any of the water soluble compounds of vanadium may be used in amounts depending upon the kind of vanadium compound, as well as the intensity of the action desired.

Typical examples of vanadium salts found suitable are: di-vanadyl sulfate, $V_2O_2(SO_4)_2$; vanadyl sulfate, $V_2O_2(SO_4)_3$; di-vanadyl chloride, $V_2OCl_2$; meta-vanadic acid, $HVO_3$; sodium meta-vanadate, $NaVO_3$; sodium ortho-vanadate $Na_3VO_4 16H_2O$; and ammonium meta-vanadate, $NH_4VO_3$, etc.

While the vanadium is used in combination with an oxidizing compound of a halogen, as the bromate, the combination of halogen compound, e. g. the bromate and vanadium may be used in conjunction with other known bread improving chemicals without interfering with further action. Further, the vanadium compound may be utilized alone, i. e., without an innocuous oxidizing compound of a halogen, and when so used gives improved qualities, as finer texture and enhanced crumb color. Also, the hydrogen ion concentration may have a value of pH 3 to 6, it being noted that the rapidity of decomposition of the iodate in higher acid concentrations indicates the desirability of utilizing a dough mix having a higher pH value.

The most satisfactory amounts of vanadium range from 0.2 to 0.6 parts per million based upon the weight of the flour used in compounding the dough, when the vanadium compound is used in conjunction with the oxidizing halogen compound. However, when the vanadium is employed alone the range may then be from about 1.3 parts to 2.2 parts per million.

Typical formulas, given by way of example, which are based on 100 pounds of flour, are as follows:

(A)

| | Parts by weight |
|---|---|
| Calcium acid phosphate | 0.2 |
| Ammonium sulfate | 0.028 |
| Potassium bromate | 0.0005 |
| Potassium iodate | 0.0004 |
| Sodium meta-vanadate | 0.00006 |
| Sodium chloride | 0.08 |
| Flour | 0.0911 |

(B)

| | Parts by weight |
|---|---|
| Calcium acid phosphate | 0.2 |
| Ammonium sulfate | 0.028 |
| Potassium chlorate | 0.0007 |
| Sodium meta-vanadate | 0.00006 |
| Sodium chloride | 0.08 |
| Flour | 0.0911 |

(C)

| | Parts by weight |
|---|---|
| Calcium acid phosphate | 0.2 |
| Ammonium sulfate | 0.028 |
| Potassium iodate | 0.0005 |
| Sodium meta-vanadate | 0.00006 |
| Sodium chloride | 0.08 |
| Flour | 0.0911 |

(D)

| | Parts by weight |
|---|---|
| Calcium acid phosphate | 0.2 |
| Ammonium sulfate | 0.028 |
| Sodium meta-vanadate | 0.00018 |
| Sodium chloride | 0.08 |
| Flour | 0.0911 |

These compositions of matter which include the water soluble vanadium compound may be supplied and sold separately, so that the desired percentage may be mixed with a given quantity of flour by weight, or the same quantity of the composition may be added to the flour and sold to the trade as a prepared flour.

In preparing a dough with the treated flour, the flour may be incorporated and the dough processed in the usual manner, but if the composition of matter is used separately, it is desirable to add it in the proportion of 0.5 part by weight to 100 pounds of flour before the flour is incorporated into a dough mixture.

When flour containing the bromate, chlorate and/or iodate and vanadium substances is incorporated into a dough, the activity, e. g. of the bromate, is greatly improved by the presence of the vanadium compound to bring about the better maturing action of the dough.

The final bakery products as produced from the dough thus prepared are far superior to those prepared without the vanadium in that they have a finer, more silky texture and have a better crumb color.

This application is in part a continuation of my copending application Serial No. 712,353, filed February 21, 1934.

Having described my invention what I claim as new and desire to secure by Letters Patent is:

1. A composition of the character described including a water soluble vanadium compound, and an innocuous oxidizing bromine compound.

2. A composition of the character described including sodium-ortho-vanadate, and an innocuous oxidizing bromine compound.

3. A composition of the character described including sodium meta-vanadate, and an innocuous oxidizing bromine compound.

4. A composition of the character described including sodium di-vanadyl sulphate, and an innocuous oxidizing bromine compound.

5. A composition of the character described including a water soluble vanadium compound and potassium bromate.

6. A composition of the character described including sodium meta-vanadate, and potassium bromate.

7. A prepared flour including a water-soluble vanadium compound, and an innocuous oxidizing bromine compound.

8. A prepared flour including sodium ortho-vanadate, and an innocuous oxidizing bromine compound.

9. A prepared flour including sodium meta-vanadate, and an innocuous oxidizing bromine compound.

10. A prepared flour including sodium di-vanadyl sulfate, and an innocuous oxidizing bromine compound.

11. The process of making leavened bakery products, including incorporating with the flour and other ingredients of a dough mix a water-soluble vanadium compound, and an innocuous oxidizing bromine compound.

12. The process of making leavened bakery products, including incorporating with the flour and other ingredients of a dough mix sodium ortho-vanadate, and an innocuous oxidizing bromine compound.

13. The process of making leavened bakery products, including incorporating with the flour and other ingredients of a dough mix sodium meta-vanadate, and an innocuous oxidizing bromine compound.

14. The process of making leavened bakery products, including incorporating with the flour and other ingredients of a dough mix sodium di-vanadyl sulfate, and an innocuous oxidizing bromine compound.

15. The process of making leavened bakery products, including incorporating with the flour and other ingredients of a dough mix a water soluble vanadium compound and potassium bromate.

16. The process of making leavened bakery products, including incorporating with the flour and other ingredients of a dough mix sodium meta-vanadate, and potassium bromate.

17. The process of making leavened bakery products, including incorporating with the flour and other ingredients of a dough mix sodium ortho-vanadate, and potassium bromate.

18. The process of making leavened bakery products, including incorporating with the flour and other ingredients of a dough mix sodium di-vanadyl sulfate, and potassium bromate.

19. A composition of the character described including flour, an innocuous oxidizing bromine compound, and a water soluble vanadium compound in which vanadium is present in an amount equivalent to 0.2 part to 0.6 part by weight of vanadium per million parts by weight of flour.

20. A prepared flour including an innocuous oxidizing bromine compound, and a water soluble vanadium compound in which vanadium is present in an amount equivalent to 0.2 part to 0.6 part by weight of vanadium per million parts by weight of flour.

21. A dough mix including flour, an innocuous oxidizing bromine compound, and a water soluble vanadium compound in which vanadium is present in an amount equivalent to 0.2 to 0.6 part by weight of vanadium per million parts by weight of flour.

22. A composition of the character described including an innocuous oxidizing bromine compound, and sodium meta-vanadate wherein the sodium meta-vanadate is present in an amount equivalent to 0.00006 part by weight and the bromine compound is present in an amount equivalent to 0.0005 part by weight.

23. A composition of the character described including flour, an innocuous oxidizing bromine compound, an iodate, and a water soluble vanadium compound in which the vanadium is present in an amount equivalent to 0.2 part to 0.6 part by weight of vanadium per million parts by weight of flour.

24. A composition of the character described including flour, a baking acid, a bromate, and a water soluble vanadium compound in which the vanadium is present in an amount equivalent to 0.2 to 0.6 part by weight of vanadium per million parts by weight of flour.

25. A composition of matter of the character described for use in making yeast-leavened bread, comprising a baking acid, a bromate, and a water soluble vanadium compound, the proportion of vanadium to baking acid being approximately 125 parts per million.

26. A composition of matter of the character described for use in making yeast-leavened bread, comprising mono-calcium phosphate, a bromate, and a water-soluble vanadium compound, said vanadium compound being present in an amount equivalent to approximately 125 parts of vanadium per million parts of mono-calcium phosphate.

27. A composition of matter of the character described for use in making yeast-leavened bread, comprising mono-calcium phosphate, potassium iodate, a bromate, and a water soluble vanadium compound, said vanadium compound being present in an amount equivalent to approximately 125 parts of vanadium per million parts of mono-calcium phosphate.

28. A composition of matter of the character described for use in making yeast-leavened bread, comprising the following ingredients in approximately the proportions recited:

| | Parts |
|---|---|
| Mono-calcium phosphate | 50 |
| Ammonium sulphate | 7 |
| Potassium bromate | 0.125 |
| Potassium iodate | 0.1 | and a water-soluble vanadium compound in the proportion of about 125 parts of vanadium per million parts of mono-calcium phosphate.

29. A prepared flour including a water-soluble vanadium compound in an amount of approximately 1.3 parts to 2.2 parts by weight of vanadium per million parts by weight of flour.

30. A prepared flour including sodium meta-vanadate in an amount of approximately 1.3 parts to 2.2 parts by weight of vanadium per million parts by weight of flour.

31. The process of making leavened bakery products including incorporating with the flour and other ingredients of a dough mix a water-soluble vanadium compound in an amount of approximately 1.3 parts to 2.2 parts by weight of vanadium per million parts by weight of flour.

32. The process of making leavened bakery products including incorporating with the flour and other ingredients of a dough mix sodium meta-vanadate in an amount of approximately 1.3 parts to 2.2 parts by weight of vanadium per million parts by weight of flour.

33. A composition of the character described including flour and a water-soluble vanadium compound in which vanadium is present in an amount equivalent to 1.3 parts to 2.2 parts by weight of vanadium per million parts by weight of flour.

34. A composition of the character described for use in making yeast-leavened bread, comprising flour, a baking acid and a water soluble vanadium compound, the proportion of vanadium to the flour being approximately 1.3 parts to 2.2 parts by weight of vanadium per million parts by weight of flour.

35. A composition of the character described including a water-soluble vanadium compound and an innocuous oxidizing compound of a halogen belonging to the group chlorine, bromine and iodine.

36. A composition of the character described including sodium meta-vanadate and an innocuous oxidizing compound of a halogen belonging to the group chlorine, bromine and iodine.

37. A prepared flour including a water-soluble vanadium compound and an innocuous oxidizing compound of a halogen belonging to the group chlorine, bromine and iodine.

38. A prepared flour including sodium meta-vanadate and an innocuous oxidizing compound of a halogen belonging to the group chlorine, bromine and iodine.

39. The process of making leavened bakery products including incorporating with the flour and other ingredients of a dough mix a water-soluble vanadium compound and an innocuous oxidizing compound of a halogen belonging to the group chlorine, bromine and iodine.

40. A composition of the character described including flour, an innocuous oxidizing compound of a halogen belonging to the group chlorine, bromine and iodine, and a water-soluble vanadium compound in which vanadium is present in an amount equivalent to 0.2 part to 0.6 part by weight of vanadium per million parts by weight of flour.

41. A composition of the character described for use in making yeast-leavened bread comprising a baking acid, an innocuous oxidizing compound of a halogen belonging to the group chlorine, bromine and iodine, and a water-soluble vanadium compound, the proportion of vanadium to baking acid being approximately 125 parts per million.

42. A composition of matter of the character described for use in making yeast leavened bread, comprising flour, a baking acid, an ammonium salt, and a water soluble vanadium compound, the proportion of vanadium to the flour being approximately 1.3 parts to 2.2 parts by weight of vanadium per million parts by weight of flour.

43. A composition of matter of the character described for use in making yeast leavened bread, comprising flour, a baking acid, an ammonium salt, and sodium meta-vanadate, the proportion of vanadium to the flour being approximately 1.3 parts to 2.2 parts by weight of vanadium per million parts by weight of flour.

44. The process of making leavened bakery products, including incorporating with the flour and other ingredients of a dough mix a minute quantity of water-soluble vanadium compound whereby the gas development of the dough is improved.

CHARLES H. MacINTOSH.